(12) United States Patent
Le Roux (10) Patent No.: US 11,716,776 B2
(45) Date of Patent: Aug. 1, 2023

(54) METHODS AND DEVICES FOR PAIRING IN A WIRELESS NETWORK

(71) Applicant: SAGEMCOM BROADBAND SAS, Rueil Malmaison (FR)

(72) Inventor: Sylvain Le Roux, Rueil Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 0 days.

(21) Appl. No.: 17/618,357

(22) PCT Filed: Jun. 9, 2020

(86) PCT No.: PCT/EP2020/065985
§ 371 (c)(1),
(2) Date: Dec. 10, 2021

(87) PCT Pub. No.: WO2020/249566
PCT Pub. Date: Dec. 17, 2020

(65) Prior Publication Data
US 2022/0217796 A1 Jul. 7, 2022

(30) Foreign Application Priority Data
Jun. 13, 2019 (FR) .................................... 1906327

(51) Int. Cl.
*H04W 76/14* (2018.01)
*H04B 17/318* (2015.01)
(Continued)

(52) U.S. Cl.
CPC .......... *H04W 76/14* (2018.02); *H04B 17/318* (2015.01); *H04W 4/12* (2013.01); *H04W 48/20* (2013.01)

(58) Field of Classification Search
CPC ....................................................... H04W 88/08
(Continued)

(56) References Cited

U.S. PATENT DOCUMENTS 7,480,264 B1 1/2009 Duo et al.
9,036,503 B1* 5/2015 Wurtenberger ....... H04W 36/22
370/331

(Continued)

FOREIGN PATENT DOCUMENTS

EP 3253120 A1 12/2017
WO 2015/154927 A1 10/2015

OTHER PUBLICATIONS

Sep. 3, 2020 International Search Report issued in International Patent Application No. PCT/EP2020/065985.

*Primary Examiner* — Kiet M Doan
(74) *Attorney, Agent, or Firm* — Oliff PLC; R. Brian Drozd (57) ABSTRACT

A method for pairing a terminal with an access point in a wireless communication network is described. The network comprises a plurality of access points that are centrally coordinated by a manager device. The method comprises the following steps executed by at least one access point: receiving a first message comprising information indicating that said terminal wishes to pair with said access point; sending a second message to said manager device, said second message comprising information indicating that said terminal wishes to pair with said access point; adding, in at least one beacon frame of said access point, information indicating that a pairing session is active, only on receipt of a message from said manager device notifying said access point to engage a pairing session with said terminal; and pairing said access point and said terminal.

17 Claims, 5 Drawing Sheets

(51) Int. Cl.
    *H04W 4/12*     (2009.01)
    *H04W 48/20*    (2009.01)
(58) Field of Classification Search
    USPC .......................................... 455/435.3, 452.1
    See application file for complete search history.

(56) References Cited

U.S. PATENT DOCUMENTS

| | | | |
|---|---|---|---|
| 11,240,746 B1* | 2/2022 | Wong | H04W 48/20 |
| 2015/0063223 A1* | 3/2015 | Shen | H04W 52/265 |
| | | | 370/329 |
| 2015/0296450 A1* | 10/2015 | Koo | H04W 48/16 |
| | | | 455/435.3 |
| 2020/0389857 A1* | 12/2020 | Lefevere | H04W 52/367 |

* cited by examiner

METHODS AND DEVICES FOR PAIRING IN A WIRELESS NETWORK

TECHNICAL FIELD

The invention relates to a method for pairing a terminal with an access point in a wireless communication network comprising a plurality of access points.

PRIOR ART

A wireless communication network (hereinafter "network") conforming to one of the IEEE 802.11 standards typically comprises a plurality of electronic devices comprising at least one radiofrequency module allowing the establishment of communications in accordance with one of the IEEE 802.11 standards, or in other words, in accordance with one of the Wi-Fi standards. Such a network typically comprises an electronic device commonly called an access point (or "AP") and a plurality of electronic devices called terminals (or users) which are able to establish wireless connections with the access point and/or with one another. In a residential environment, the electronic access point device is typically a "box" provided by an Internet operator, that is to say a home gateway (or "residential gateway"). The terminals are typically computers, televisions, tablets or "smart" telephones ("smartphones"). It is thus commonly said that the terminals are associated with the access point "by Wi-Fi".

Wireless communication coverage extension systems may be used to increase the range of these wireless communication networks by coordinating multiple distributed access points. These various access points all provide a single wireless local area network (WLAN). In the context of Wi-Fi (registered trademark) technology, all of these access points thus use the same SSID ("Service Set IDentifier") and the same password (also called the security key). Thus, the wireless communication coverage extension is transparent to devices connected to the WLAN.

The user of a terminal wishing to connect to a Wi-Fi network must conventionally enter an SSID ("Service Set IDentifier") of the network and a password (also called a security key). In order to improve the security of such connections and in particular to allow the use of complex passwords, the WFA ("Wi-Fi Alliance") has defined a protocol called WPS ("Wi-Fi Protected Setup") allowing a new terminal to be easily associated with an existing Wi-Fi network. This protocol allows two devices (for example a computer and an access point) to connect to one another, for example when a user presses a physical or virtual button on both devices within a certain time, for example two minutes. The two devices will then recognize one another and the access point will provide the terminal with all of the information necessary for its connection, in particular the SSID and the password, without the user having to provide them.

The WPS protocol also defines specific mechanisms for preventing a terminal from connecting to a Wi-Fi network other than the one to which it wishes to connect in the event that a WPS session is in progress on this other Wi-Fi network. Likewise, the WPS protocol defines specific mechanisms for preventing an unknown terminal from connecting to the user's Wi-Fi network. These cases are "overlap" cases.

To that end, provision is made for an access point, called the current access point, to listen for other WPS sessions in progress on other access points. If a WPS session is in progress on another access point, then the current access point ends its own WPS session. Provision is also made for a terminal to scan all of the channels that it supports to search for a WPS session on an access point. If it detects more than one, it must end its own session and warn the user, except in the specific case described below. The WPS protocol thus prevents a terminal from connecting to a network other than the intended one because this other network would have a WPS session in progress at the same time. The current WPS protocol does not allow multiple WPS sessions on the same frequency band. However, in the particular case of a multi-band access point (e.g. 2.4 Ghz and 5 Ghz), it is tolerated to have a WPS session on each of the bands at the same time provided that the two sessions have the same UUID (for "Universally Unique IDentifier"). A terminal detecting these two sessions should therefore not end its own session.

Defining a single access point to respond to WPS connection requests makes it possible to avoid certain cases of overlap. However, a terminal far from this particular access point will not be able to connect to the network while it may be spatially closer to another access point.

It is then desirable to overcome these drawbacks of the prior art.

DISCLOSURE OF THE INVENTION

A method for pairing a terminal with an access point in a wireless communication network is described. The network comprises a plurality of access points that are centrally coordinated by a manager device. The method comprises the following steps executed by at least one access point:
  receiving a first message comprising information indicating that the terminal wishes to pair with the access point;
  sending a second message to the manager device, the second message comprising information indicating that the terminal wishes to pair with the access point;
  adding, in at least one beacon frame of the access point, information indicating that a pairing session is active, only on receipt of a message from the manager device notifying the access point to engage a pairing session with the terminal; and
  pairing the access point and the terminal.

According to one embodiment, the method further comprises the following steps:
  stopping the method in the event that the access point detects a beacon frame of another access point indicating that a pairing session is in progress on this other access point; and
  sending a message to the manager device indicating an overlap of pairing sessions.

According to one embodiment, the wireless communication network conforms to one of the IEEE 802.11 standards.

According to one embodiment, the pairing session conforms to the WPS protocol.

According to one embodiment, a method for pairing a terminal with an access point of a wireless communication network is described, the network comprising a plurality of access points that are centrally coordinated by a manager device. The method comprises the following steps executed by the manager device:
  receiving a message from at least one access point of the plurality of access points comprising information indicating that the terminal wishes to pair with the access point;
  selecting a single access point from among the access points with which the terminal wishes to pair; and sending a message to the selected access point indicating to initiate a pairing session with the terminal and a stop message to unselected access points.

According to one embodiment, selecting a single access point from among the access points with which the terminal wishes to pair comprises:

determining a value for each of said access points with which said terminal wishes to pair, said value for a given access point being representative of the capability of said access point to complete the pairing of said terminal; and selecting the access point having an optimal value.

According to one embodiment, the value for a given access point is equal to one of the following values:

a) a number of pairing requests detected by said access point for said terminal;

b) an average of the signal strength indications received from the probe requests containing said detected pairing requests;

c) the delay of the first pairing request detected by said access point with respect to the first pairing request detected over all of said access points;

d) a combination, linear or otherwise, of at least two values from among a), b) and c).

A method for pairing a terminal with an access point of a wireless communication network is described, the network comprising a plurality of access points that are centrally coordinated by a manager device. The method comprises the following steps:

at least one access point receiving a first message comprising information indicating that the terminal wishes to pair with the access point;

the access point sending a second message to the manager device, the second message comprising information indicating that the terminal wishes to pair with the access point;

the manager device receiving the second message;

the manager device selecting a single access point from among the access points with which the terminal wishes to pair;

sending a third message to the selected access point indicating thereto to initiate a pairing session with the terminal and a stop message to unselected access points;

adding, in at least one beacon frame of the selected access point, information indicating that a pairing session is active, only on receipt of the third message by the access point; and pairing the access point and the terminal.

An access point device configured for pairing a terminal in a wireless communication network to the access point is described, the network comprising a plurality of access points that are centrally coordinated by a manager device. The access point device comprises:

means for receiving a first message comprising information indicating that the terminal wishes to pair with the access point;

means for sending a second message to the manager device, the second message comprising information indicating that the terminal wishes to pair with the access point;

means for adding, in at least one beacon frame of the access point, information indicating that a pairing session is active, only on receipt of a message from the manager device notifying the access point to engage a pairing session with the terminal; and means for pairing the access point and the terminal.

A manager device configured for pairing a terminal with an access point of a wireless communication network is described, the network comprising a plurality of access points that are centrally coordinated by the manager device. The manager device comprises:

means for receiving a message from at least one access point of the plurality of access points comprising information indicating that the terminal wishes to pair with the access point;

means for selecting a single access point from among the access points with which the terminal wishes to pair; and means for sending a message to the selected access point indicating to initiate a pairing session with the terminal and a stop message to unselected access points.

A system for pairing a terminal with an access point of a wireless communication network is described, the network comprising a plurality of access points that are centrally coordinated by a manager device. The system comprises:

means, in at least one access point, for receiving a first message comprising information indicating that the terminal wishes to pair with the access point;

means, in the access point, for sending a second message to the manager device, the second message comprising information indicating that the terminal wishes to pair with the access point;

means, in the manager device, for receiving the second message;

means, in the manager device, for selecting a single access point from among the access points with which the terminal wishes to pair;

means, in the manager device, for sending a third message to the selected access point indicating thereto to initiate a pairing session with the terminal and a stop message to unselected access points;

means, in the selected access point, for adding, in at least one beacon frame, information indicating that a pairing session is active, the information being added only on receipt of the third message by the access point; and means for pairing the access point and the terminal.

A computer program is also described, which may be stored on a medium and/or downloaded from a communication network, in order to be read by a device. This computer program comprises instructions for implementing the method mentioned above according to any one of its variants, when the program is executed by a computing unit of the device. The invention also relates to storage means comprising such a computer program.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF EMBODIMENTS

Figure 1:
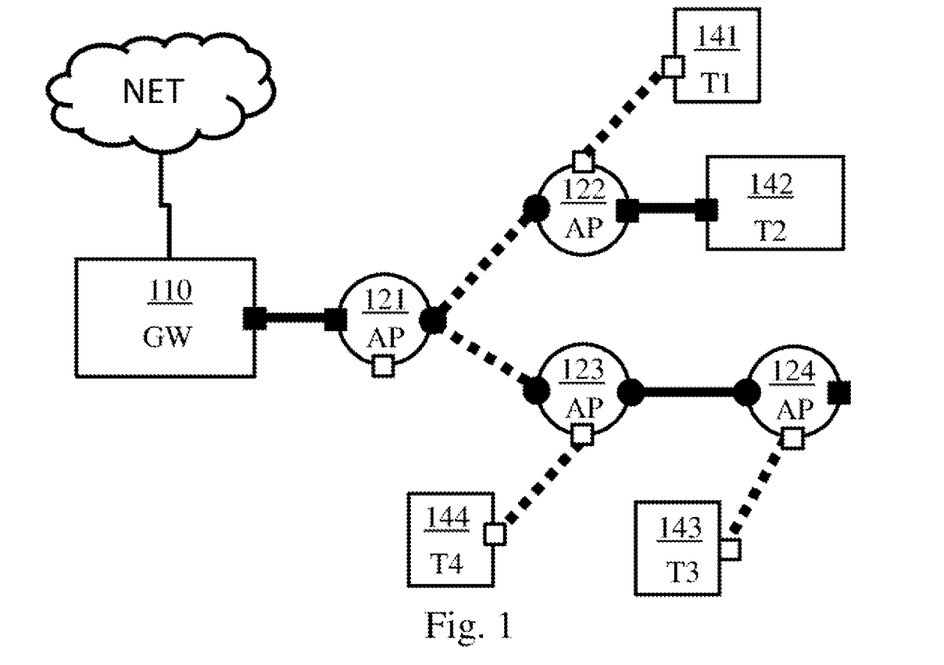
FIG. 1 schematically illustrates a wireless communication system in which the present invention may be implemented.

FIG. 1 schematically illustrates a wireless communication system in which the present invention may be implemented. The communication system comprises a set of interconnected access points AP to a wireless local area network WLAN 121, 122, 123 and 124. The access points AP all provide the same wireless local area network WLAN (same name, etc.). In the context of Wi-Fi technology, all of these access points AP thus use the same SSID identifier and the same password.

The access points are interconnected by means of wired links, for example of Ethernet type, or by wireless links, for example a Wi-Fi link using an SSID identifier different from said wireless local area network WLAN itself. It should be noted that there may be a plurality of access points in one and the same physical equipment (for example an Internet gateway such as the gateway GW 110, a Wi-Fi extender, or a television set-top box which might act as an extender of the Wi-Fi network). These access points may operate in the same frequency band or else on different bands.

Illustratively, FIG. 1 shows that the AP 121 is connected to the AP 122 and to the AP 123 by virtue of a wireless link represented by dotted lines (separate from the wireless local area network WLAN itself), and the AP 124 is connected to the AP 123 by virtue of a wired link represented by solid lines.

The wireless communication coverage extension system thus makes it possible to interconnect an Internet access gateway GW 110, a terminal T1 141, a terminal T2 142, a terminal T3 143 and a terminal T4 144. The terminal T1 141 is, for example, a smart telephone ("smartphone") connected by a wireless link to the AP 122, that is to say that the terminal T1 141 is thus connected via the wireless local area network WLAN by virtue of the access point AP 122. The terminal T2 142 is, for example, a PC connected by a wired link to the AP 122. The terminal T3 143 is, for example, a tablet connected by a wireless link to the AP 124, that is to say that the terminal T3 143 is thus connected via the wireless local area network WLAN by virtue of the access point AP 124. The terminal T4 144 is, for example, a network storage unit NAS ("Network Attached Storage") connected by a wireless link to the AP 123, that is to say that the terminal T4 144 is thus connected via the wireless local area network WLAN by virtue of the access point AP 123.

In such a system, each access point of the network hosts an executing device and the access points are centrally coordinated by a manager device. At any given moment, there is a single manager device in the entire network. The manager device may be hosted by one of the APs of the network or else by another device not shown in FIG. 1 (for example a server). The manager device may be designated by fixed configuration or dynamically by election. The manager device is, for example, the AP which is closest to the Internet access gateway GW 110, namely the AP 121 in the context of FIG. 1. If a plurality of manager devices are available, just one must be chosen and active from among them. The active manager device may, for example, be selected on the basis of the serial numbers of the available manager devices. In one particular embodiment, the manager device that has the smallest serial number is chosen as the active manager. In one variant, the active manager device is selected by a user via a human-machine interface.

The manager device communicates with the executing devices via a communication bus. The ISM bus described in patent application EP2791798 is one example of such a communication bus. Specifically, the manager device needs to be aware of the executing devices present on the network. The executing devices do not communicate with one another.

Figure 2:
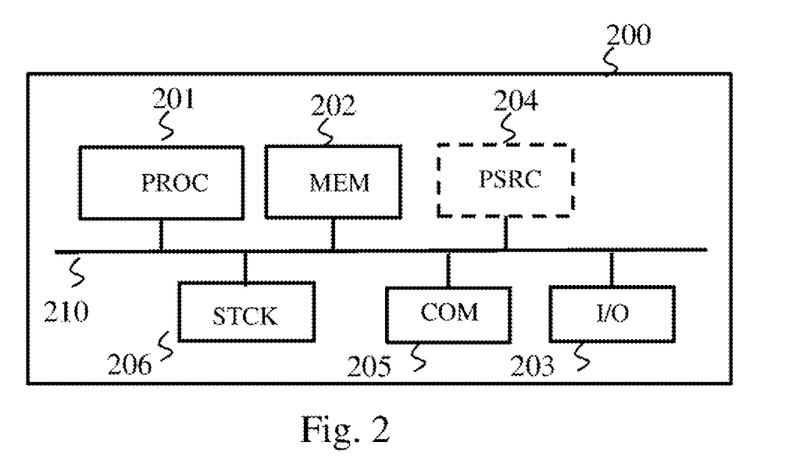
FIG. 2 schematically illustrates the hardware architecture of a manager device of a wireless communication network according to one particular embodiment.
Figure 4:
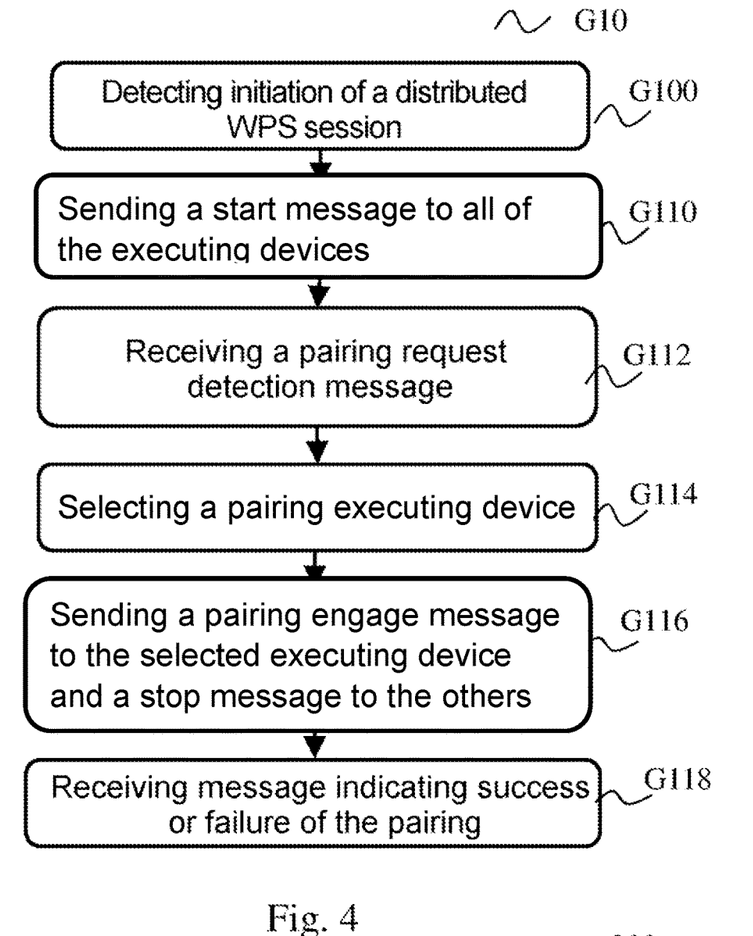
FIG. 4 schematically illustrates, on the manager device side, a method as implemented by a manager device and a plurality of executing devices located in access points of a wireless communication system comprising a plurality of access points.
Figure 6:
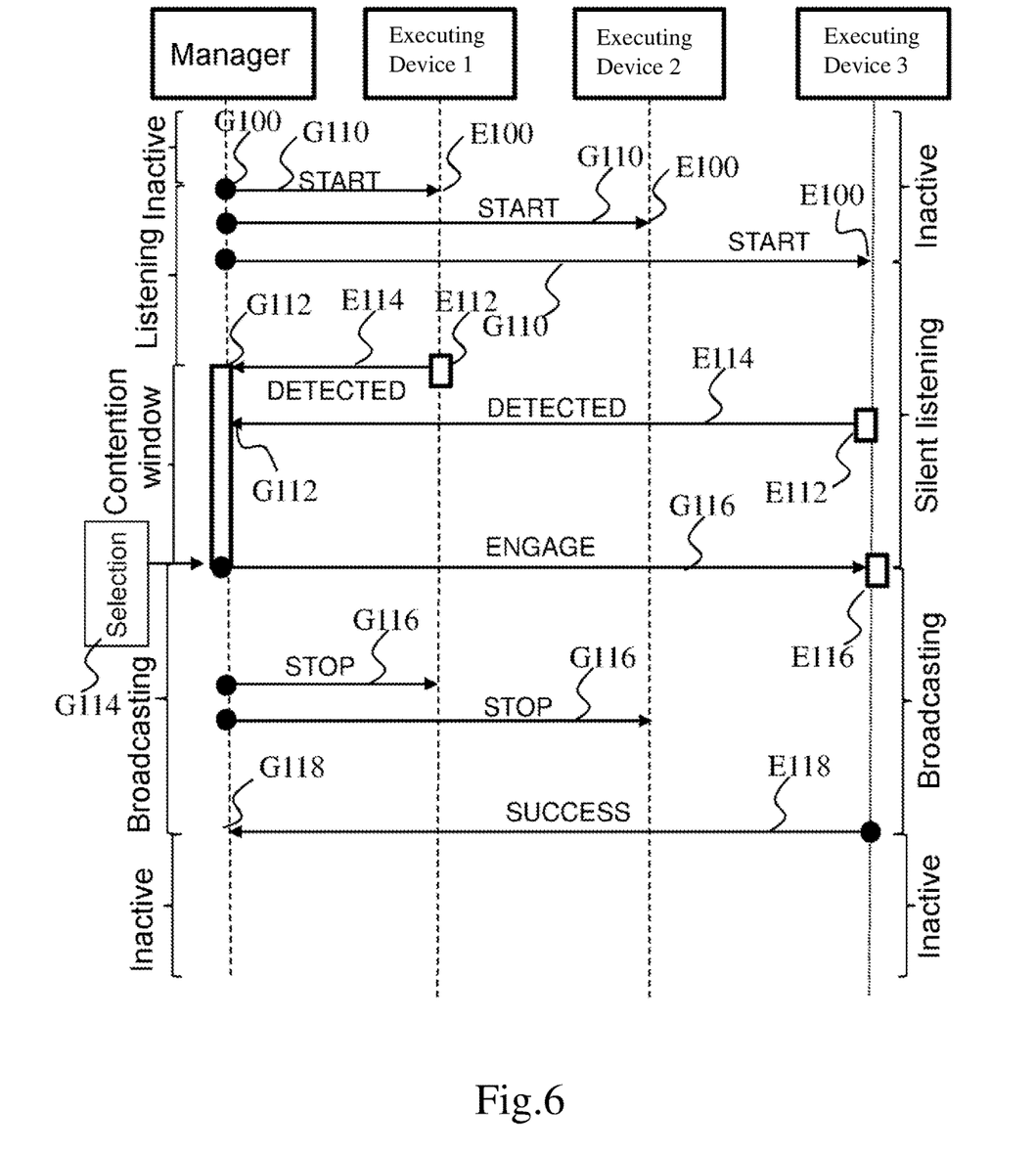
FIG. 6 schematically illustrates a method as implemented by a manager device and a plurality of executing devices located in access points of a wireless communication system comprising a plurality of access points according to a first embodiment.
Figure 7:
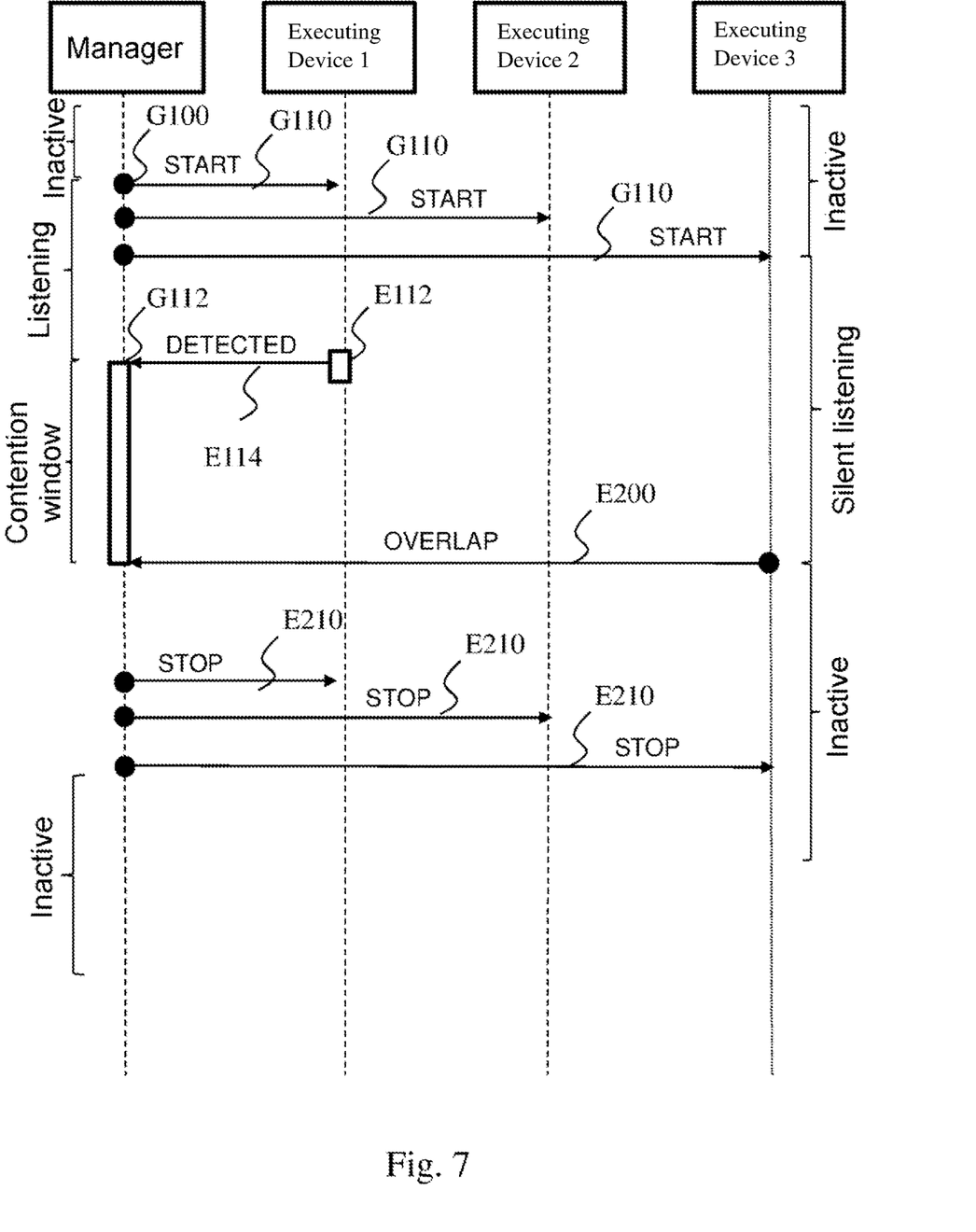
FIG. 7 schematically illustrates a method as implemented by a manager device and a plurality of executing devices located in access points of a wireless communication system comprising a plurality of access points according to a second embodiment.

FIG. 2 schematically illustrates the hardware architecture of a manager device of a wireless communication network, the manager device being able to be hosted by an access point, and being configured to execute all or some of the steps of the method G10 illustrated in FIG. 4, in FIG. 6 or in FIG. 7.

Thus, the manager device 200 comprises one or more processors 201, for example a CPU ("Central Processing Unit"), a GPU ("Graphical Processing Unit") and/or a DSP ("Digital Signal Processor"). The manager device 200 also comprises a memory MEM 202 of RAM ("Random Access Memory"), ROM ("Read Only Memory") and/or EPROM ("Erasable Programmable Read Only Memory") type. The manager device 200 may optionally comprise one or more input/output interfaces 203 (for example a keyboard, a mouse, a touchpad, a webcam, etc.), each being configured to display information and/or to allow a user to enter commands or data. The manager device 200 may also comprise a power source 204 which may also be external to the manager device. The manager device 200 may also comprise one or more communication interfaces 205. The communication interface typically allows the manager device 200 to be connected to a local area network and/or the Internet. The manager device 200 may also comprise a storage module STCK 206 which may be of magnetic medium, flash memory, optical disk, HDD ("Hard Disk Drive") or SSD ("Solid-State Drive") type, or of external storage medium reader type, such as an SD ("Secure Digital") card reader. These various elements are interconnected by a communication bus 210.

The processor CPU 201 may store data, or information, in the memory MEM 202 or in the storage module STCK 206. The processor CPU 201 may read data stored in the memory MEM 202 or in the storage module STCK 206. These data may correspond to configuration parameters.

The processor CPU 201 is able to execute instructions loaded into the memory MEM 202, for example from the storage module STCK 206. When the manager device 200 is powered on, the processor CPU 201 is able to read instructions from the memory MEM 202 and execute them. These instructions form a computer program that causes the processor CPU 201 to implement all or some of the methods and steps described below, particularly the method described in FIG. 4, in FIG. 6 or FIG. 7. Thus, all or some of the methods and steps described below may be implemented in software form through the execution of a set of instructions by a programmable machine such as a DSP ("Digital Signal Processor") or a microcontroller. All or some of the methods and steps described here may also be implemented in hardware form by a machine or a dedicated component such as an FPGA ("Field-Programmable Gate Array") or an ASIC ("Application-Specific Integrated Circuit").

According to one variant, the computer program is stored outside the manager device 200 on a non-transitory digital data support, for example an external medium such as an HDD, CD-ROM, DVD, or a storage device of USB type. The manager device 200 may therefore be configured to read a computer program.

Figure 3:
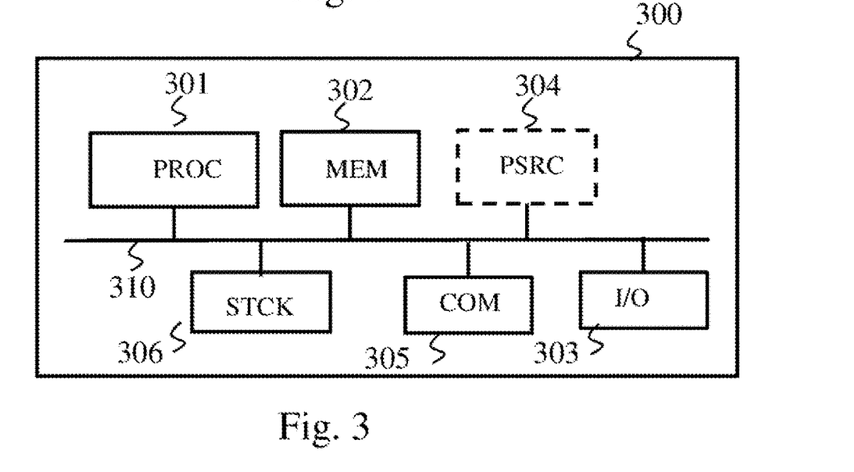
FIG. 3 schematically illustrates the hardware architecture of an executing device of a wireless communication network according to one particular embodiment.
Figure 5:
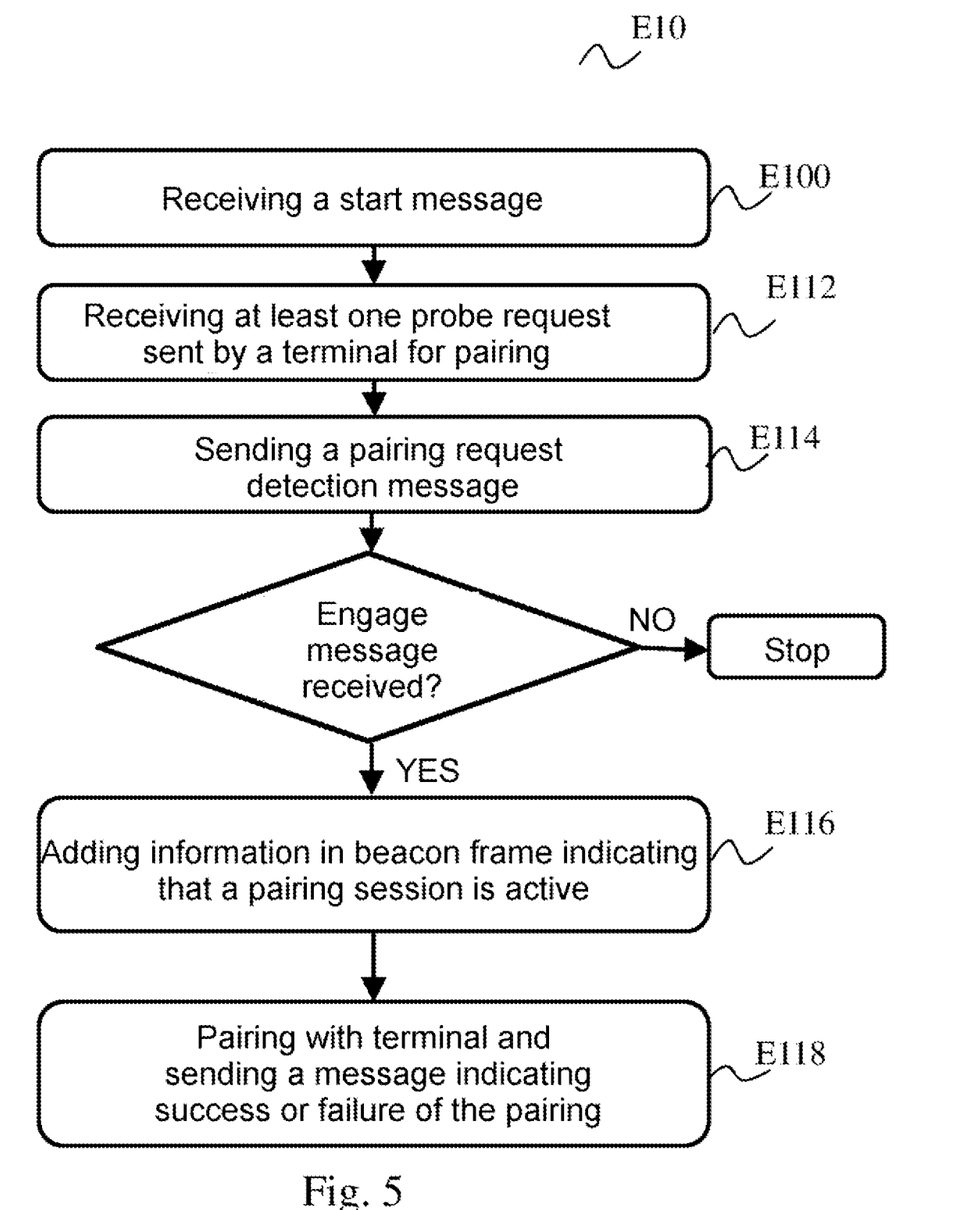
FIG. 5 schematically illustrates, on the executing device side, a method as implemented by a manager device and a plurality of executing devices located in access points of a wireless communication system comprising a plurality of access points.

FIG. 3 schematically illustrates the hardware architecture of an executing device 300 of a wireless communication network, the executing device being hosted by an access point, and being configured to execute all or some of the steps of the method E10 illustrated in FIG. 5, in FIG. 6 or in FIG. 7.

Thus, the executing device 300 comprises one or more processors 301, for example a CPU ("Central Processing Unit"), a GPU ("Graphical Processing Unit") and/or a DSP ("Digital Signal Processor"). The executing device 300 also comprises a memory MEM 302 of RAM ("Random Access Memory"), ROM ("Read Only Memory") and/or EPROM ("Erasable Programmable Read Only Memory") type. The executing device 300 may optionally comprise one or more input/output interfaces 303 (for example a keyboard, a mouse, a touchpad, a webcam, etc.), each being configured to display information and/or to allow a user to enter commands or data. The executing device 300 may also comprise a power source 304 which may also be external to the executing device. The executing device 300 may also comprise one or more communication interfaces 305. The communication interface typically allows the executing device 300 to be connected to a local area network and/or the Internet. The executing device 300 may also comprise a storage module STCK 304 which may be of magnetic medium, flash memory, optical disk, HDD ("Hard Disk Drive") or SSD ("Solid-State Drive") type, or of external storage medium reader type, such as an SD ("Secure Digital") card reader. These various elements are interconnected by a communication bus 310.

The processor CPU 301 may store data, or information, in the memory MEM 302 or in the storage module STCK 304. The processor CPU 301 may read data stored in the memory MEM 302 or in the storage module STCK 304. These data may correspond to configuration parameters.

The processor CPU 301 is able to execute instructions loaded into the memory MEM 302, for example from the storage module STCK 304. When the executing device 300 is powered on, the processor CPU 301 is able to read instructions from the memory MEM 302 and execute them. These instructions form a computer program that causes the processor CPU 301 to implement all or some of the methods and steps described below, particularly the method described in FIG. 4, in FIG. 6 or FIG. 7. Thus, all or some of the methods and steps described below may be implemented in software form through the execution of a set of instructions by a programmable machine such as a DSP ("Digital Signal Processor") or a microcontroller. All or some of the methods and steps described here may also be implemented in hardware form by a machine or a dedicated component such as an FPGA ("Field-Programmable Gate Array") or an ASIC ("Application-Specific Integrated Circuit").

According to one variant, the computer program is stored outside the executing device 300 on a non-transitory digital data support, for example an external medium such as an HDD, CD-ROM, DVD, or a storage device of USB type. The executing device 300 may therefore be configured to read a computer program.

It should be noted that the manager device 200 and the executing device 300 may be located in one and the same hardware device or in different hardware devices. The same physical equipment may therefore host both the manager device and one or more executing devices.

FIGS. 4, 5 and 6 schematically illustrate a method as implemented by a manager device and a plurality of executing devices located in access points of a wireless communication system comprising a plurality of access points. In one particular embodiment, the wireless communication system is a Wi-Fi network. More particularly, FIG. 4 illustrates the method from the point of view of the manager device (steps G100 to G118) and FIG. 5 illustrates the method from the point of view of the executing device in an access point (steps E100 to E118). FIG. 6 illustrates the method implemented by the manager device/executing device system and repeats all of the steps G100 to G118 and E100 to E118. In the following, the manager device is called the manager and the executing device is called the executing device.

The manager may be in four different modes: inactive, listening, broadcasting and contention window.

An executing device, located in an access point, may be in three different modes: inactive, listening, and broadcasting. In the remainder of the document, the terms executing device or access point are used interchangeably.

In a step G100, the manager detects the initiation, by a user, of a WPS session, called a distributed WPS session. Such a session is initiated, for example, by pressing a physical button on one of the access points of the system. According to one variant, such a session is initiated by pressing a virtual button of a human-machine interface associated with one of the access points of the system. More precisely, pressing the button (whether physical or virtual) on one of the access points of the system initiates a distributed WPS session if none is in progress and stops the distributed WPS session if it is already in progress. Specifically, at any time, the user may interrupt a WPS session in progress by pressing the button.

Therefore, if the manager is in inactive mode, then it interprets the pressing of the button as being a request to initiate a WPS session, and it then goes into listening mode and goes to step G110. If, conversely, the manager is in a mode other than inactive mode, it interprets the pressing of the button as being a request to stop the current distributed WPS session. In this case, it sends a stop message (STOP message) to all of the executing devices. In a step G110, the manager sends a message (START message) to each of the access points of the network, i.e. to each of the executing devices, indicating the initiation of a WPS session by the user. It also starts a countdown in order to temporally limit the WPS session initiated in step G100. The duration of this countdown is defined in advance. In one particular embodiment, its duration T1 is 120 seconds.

In a step E100, the executing device receives the START message. If it is in inactive mode, it switches to silent listening mode as shown in FIG. 6. If it is in a mode other than inactive mode, then the executing device ignores the START message.

In a step E112, in the silent listening phase, the executing device listens for the pairing requests sent by a terminal of the wireless communication network. To that end, the executing device searches in the probe requests sent by the terminal and received thereby for an IE ("Information Element") indicating that the terminal wishes to pair with the access point via WPS ("WPS pairing").

In a step E114, in the case where it has received a probe request with an information element indicating that the terminal wishes to pair with the access point via WPS, the executing device sends the manager a detection message (DETECTED message) informing it of this request. This message comprises the following information: the date when the probe request was received in E112, an identifier of the terminal (BSSID or "Basic Service Set IDentifier"), an indication of the strength of the signal sent by the terminal and received by the access point (RSSI or "Received Signal Strength Indication").

In a step G112, the manager receives one or more DETECTED messages originating from one or more access points. If the manager is in listening mode when it receives a first DETECTED message, it switches to contention window mode for a certain duration T2. To that end, the manager may start a countdown whose duration is equal to T2. For example, T2=5 seconds. In the case that the manager receives a DETECTED message while it is already in contention window mode, it then saves this message for later use. The manager saves all of the DETECTED messages received while it is in contention window mode, i.e. until the time T2 has elapsed. The contention window therefore corresponds to the period in which the manager allows itself to see whether there are other candidates, i.e. other executing devices, for pairing with a terminal.

In a step G114, the manager selects, for a given terminal, an executing device, called the pairing executing device, from among all of those which have sent a DETECTED message for said terminal.

In the particular case where the manager has received, in step G112, one or more DETECTED messages from a single executing device, the latter is selected as the pairing executing device.

In the case where the manager has received, in step G112, one or more DETECTED messages from a plurality of executing devices (K devices) concerning a same terminal, the manager selects one from among them. In one particular embodiment, a value is determined for each access point. This value is representative of the capability of said access point to complete the pairing of said terminal.

This value for a given access point is, for example, equal to:
a) a number of pairing requests detected by said access point for said terminal;
b) an average of the signal strength indications received from the probe requests containing said detected pairing requests;
c) a delay of the first pairing request detected by said access point with respect to the first pairing request detected over all of said access points;
d) a combination of at least two values from among a), b) and c).

The manager selects, as the pairing executing device, the device that has an optimal value, for example the highest number of detected pairing requests, an average of the highest received signal strength indications, or a shortest delay of the first detected pairing request.

In one particular embodiment, this value is, for example, a combination, linear or otherwise, of a plurality of values, for example a detection delay with respect to a first detection, i.e. with respect to the first received DETECTED message, the RSSI and a number of DETECTED messages sent by this executing device for the terminal in question and potentially an occupancy rate. For each executing device i that has sent a DETECTED message in a step E114, Ti denotes the date (for example defined in milliseconds) of detection of the first pairing request, $RSSI_i$ denotes the average RSSI of the probe requests containing these pairing requests and Ni denotes the number of detected pairing requests. The value $S_i$ for an executing device of index i is, for example, equal to $(T_i - \min_{\forall k \in [0;K]} T_k)/500 - RSSI_i - N_i$, $\min_{\forall k \in [0;K]} T_k$ is the smallest value of $T_k$ over all of the K executing devices.

The manager selects the device that has the smallest value as the pairing executing device. In one alternative embodiment, the value Si for an executing device of index i is, for example, equal to:

$$S_i = \alpha * \left( T_i - \min_{\forall k \in [0;K]} T_k \right) + \beta * RSSI_i + \tau_i + B_i$$

where:
$\tau_i$ is the occupancy rate of the executing device of index i;
$B_i$ is a bonus value specific to the executing device of index i, which depends, for example, on the frequency band (2.4 GHz, 5 GHz, 6 GHz) used by this executing device; and
α, β, δ and μ are constants.

For example, α=0.02, β=−1, δ=2, μ=10, Bi=5 for the 2.4 GHz band, 2 for the 5 GHz band, and 0 for the 6 GHz band.

The occupancy rate of the executing device of index i is, for example, defined by the following formula: $\tau_i = \delta * N_i + \mu * (1 - TXOP_i)$. The value $TXOP_i$ is the proportion of transmission time available, that is to say the proportion of the time in which the executing device i may transmit if it has traffic to transmit. This value is determined by relating the transmission time available to the total duration of the measurement period. It is therefore a value that varies between 0 and 1, 0 meaning that it is not possible to transmit any more and 1 that all of the time is available.

In the case where the manager has received, in step G112, one or more DETECTED messages from a plurality of executing devices concerning different terminals, it cannot make a selection. This situation is considered to be an overlap case. In this particular case, the manager sends a stop message (STOP message) to all of the executing devices and returns to the inactive state.

In a step G116, the manager sends an ENGAGE message to the executing device selected in step G114 and a STOP message to the other executing devices, i.e. those not selected in step G114. The ENGAGE message indicates to the selected executing device to initiate a pairing session with said terminal.

In a step E116, the executing device selected in step G114 receives the ENGAGE message and the access point adds, in at least one beacon frame, an information element (IE) indicating that a pairing session is active. This addition is made only on receipt of the ENGAGE message from the manager indicating to the access point to initiate a pairing session with the terminal. In other words, an executing device does not add an information element (IE) in its beacon frames indicating that a pairing session is active during the silent listening phase. The absence of this information in the beacon frames broadcast by the access point in steps E112, E114, G112, G114 and G116 makes it impossible to detect a situation of overlap by another access point or by a terminal.

Specifically, in the case of a conventional WPS session, a case of overlap would be detected by a terminal when receiving at least two beacon frames originating from two different access points and both containing an information element (IE) indicating that a WPS pairing session is in progress.

In a step E118, the selected executing device will therefore allow the terminal to join the network as in a conventional WPS session. If the terminal joins the network, then the executing device sends a SUCCESS message to the manager informing it of the successful pairing and returns to inactive mode. If the pairing of the terminal fails, the executing device sends a FAILURE message to the manager informing it of the failure to pair and returns to inactive mode.

In a step G118, the manager receives a message from the pairing executing device indicating the success or failure of the pairing. It then sends a stop message (STOP message) to all of the executing devices and returns to inactive mode.

At any time, the user may interrupt a WPS session in progress, for example by pressing a physical or virtual button on a human-machine interface. In that case, the manager, which is in a mode other than inactive mode, switches to inactive mode. It then sends a stop message to all of the executing devices (STOP message).

A WPS session may also be terminated when the first countdown (started when the manager entered listening mode) T1 has elapsed. In that case, the manager returns to inactive mode and sends a stop message (STOP message) to all of the executing devices. On receipt of a stop message, an executing device returns to inactive mode and sends a failure message (FAILURE message) to the manager. It stops any countdowns it started when it was in a silent listening mode. In the particular case where pairing with a terminal is in progress, it ends the pairing before returning to inactive mode.

On detection of an overlap case, an executing device must return to the inactive state, send the manager an overlap message (OVERLAP message) to inform it of said overlap and stop any countdowns that it has. In the particular case where pairing with a terminal is in progress, it ends this pairing before returning to the inactive state.

In order to inform the user of the progress of the WPS session, the following messages may be displayed by the manager and/or an executing device:

Initiation of a WPS session
Detection of an overlap
Successful pairing of the terminal with a network access point
Failure to pair the terminal with a network access point In one variant, the messages are displayed using light-emitting diodes.

The method according to the invention advantageously allows a terminal to connect to a given network comprising a plurality of access points which might or might not be located in the same frequency band while retaining the simplicity of use of the WPS protocol. Initiating a WPS session on these various access points is therefore possible. This solution is particularly advantageous in the case where a plurality of access points belong to the same network and are located in the same frequency band, as is the case for wireless communication coverage extension systems ("extenders").

In one particular embodiment illustrated by FIG. 7, in order not to disrupt other devices (for example executing device 1 in FIG. 7) which might initiate a conventional WPS session nearby, the network access points also look for an information element (IE) indicating that a WPS pairing session is active in the beacon frames that they receive from other access points located nearby. In this figure, those steps which are identical to those of FIG. 6 are identified with the same reference numerals. If an executing device in silent listening or broadcasting mode (e.g. executing device 3 in FIG. 7) detects a beacon frame transmitted by an access point (e.g. executing device 1) indicating that a WPS pairing session is active for this access point, it returns to inactive mode and informs the manager of an overlap by sending an OVERLAP message in a step E200. On receipt of the overlap message, the manager returns to inactive mode and sends a stop message to all of the executing devices in a step E210.

The invention claimed is:

1. A method for pairing a terminal with an access point in a wireless communication network, said network comprising a plurality of access points that are centrally coordinated by a manager device, said method comprising the following steps executed by said manager device:
  receiving a message from at least one access point of said plurality of access points comprising information indicating that said terminal wishes to pair with said access point;
  determining a value for each of said access points with which said terminal wishes to pair, said value for a given access point being representative of the capability of said access point to complete the pairing of said terminal;
  selecting the access point having an optimal value;
  sending a message to said selected access point indicating to initiate a pairing session with said terminal and a stop message to unselected access points,
wherein said value for a given access point is a function of the delay of a first pairing request detected by said access point with respect to the first pairing request detected over all of said access points.

2. The method as claimed in claim 1, wherein said value for a given access point is equal to a combination of the delay of the first pairing request detected by said access point with respect to the first pairing request detected over all of said access points and at least one of the following values:
  a) a number Ni of pairing requests detected by said access point for said terminal or an occupancy rate of said access point;
  b) an average $RSSI_i$ of the signal strength indications received from probe requests containing said detected pairing requests.

3. The method as claimed in claim 2, wherein said value for a given access point of index i is equal to: $((T_i - \min_{\forall k \in [0;K]} T_k)/500 - RSSI_i - N_i$ where Ti is a date of detection of the first pairing request and $\min_{\forall k \in [0;K]} T_k$ is the smallest value of $T_k$ over all of the access points.

4. The method as claimed in claim 2, wherein said value for a given access point of index i is equal to:

$$S_i = \alpha * \left(T_i - \min_{\forall k \in [0;K]} T_k\right) + \beta * RSSI_i + \tau_i + B_i$$

where:
  $\tau_i$ is the occupancy rate of the access point of index i;
  $T_i$ is a date of detection of a the first pairing request;
  $\min_{\forall k \in [0;K]} T_k$ is the smallest value of $T_k$ over all of the access points;

B$_i$ is a bonus value specific to the access point of index i which depends on the frequency band used by that access point; and α, β, δ and μ are constants.

5. A non-transitory recording medium on which instructions are stored for the implementation, by a device, of the method as claimed in claim 1, when said instructions are executed by a computing unit of said device.

6. A method for pairing a terminal with an access point in a wireless communication network, said network comprising a plurality of access points that are centrally coordinated by a manager device, said method comprising the following steps:
   receiving, by at least one access point, a first message comprising information indicating that said terminal wishes to pair with said access point;
   sending, by said access point, a second message to said manager device, said second message comprising information indicating that said terminal wishes to pair with said access point;
   receiving, by the manager device, said second message;
   determining a value for each of said access points with which said terminal wishes to pair, said value for a given access point being representative of the capability of said access point to complete the pairing of said terminal; and
   selecting the access point having an optimal value;
   sending a third message to said selected access point indicating thereto to initiate a pairing session with said terminal and a stop message to unselected access points;
   adding, in at least one beacon frame of said selected access point, information indicating that a pairing session is active, only on receipt of said third message by said access point; and
   pairing said access point and said terminal,
wherein said value for a given access point is a function of the delay of a first pairing request detected by said access point with respect to the first pairing request detected over all of said access points.

7. The method as claimed in claim 6, wherein said value for a given access point is equal to a combination of the delay of the first pairing request detected by said access point with respect to the first pairing request detected over all of said access points and at least one of the following values:
   a) a number Ni of pairing requests detected by said access point for said terminal or an occupancy rate of said access point;
   b) an average RSSI$_i$ of the signal strength indications received from probe requests containing said detected pairing requests.

8. The method as claimed in claim 7, wherein said value for a given access point of index i is equal to: (T$_i$−min$_{\forall\ k\ \in[0;K]}$T$_k$)/500-RSSI$_i$-N$_i$ where Ti is a date of detection of the first pairing request and min$_{\forall\ k\ \in[0;K]}$T$_k$ is the smallest value of T$_k$ over all of the access points.

9. The method as claimed in claim 7, wherein said value for a given access point of index i is equal to:

$$S_i = \alpha * \left(T_i - \min_{\forall k \in [0;K]} T_k\right) + \beta * RSSI_i + \tau_i + B_i$$

where:
   τ$_i$ is the occupancy rate of the access point of index i;
   T$_i$ is a date of detection of the first pairing request;
   min$_{\forall\ k\ \in[0;K]}$T$_k$ is the smallest value of T$_k$ over all of the access points;
   B$_i$ is a bonus value specific to the access point of index i which depends on the frequency band used by that access point; and
   α and β are constants.

10. A manager device configured for pairing a terminal with an access point in a wireless communication network, said network comprising a plurality of access points that are centrally coordinated by said manager device, said manager device comprising at least one processor configured to:
   receive a message from at least one access point of said plurality of access points comprising information indicating that said terminal wishes to pair with said access point;
   determine a value for each of said access points with which said terminal wishes to pair, said value for a given access point being representative of the capability of said access point to complete the pairing of said terminal;
   select the access point having an optimal value; and
   send a message to said selected access point indicating to initiate a pairing session with said terminal and a stop message to unselected access points, wherein said value for a given access point is a function of the delay of a first pairing request detected by said access point with respect to the first pairing request detected over all of said access points.

11. The device as claimed in claim 10, wherein said value for a given access point is equal to a combination of the delay of the first pairing request detected by said access point with respect to the first pairing request detected over all of said access points and at least one of the following values:
   a) a number Ni of pairing requests detected by said access point for said terminal or an occupancy rate of said access point;
   b) an average RSSI$_i$ of the signal strength indications received from probe requests containing said detected pairing requests.

12. The device as claimed in claim 11, wherein said value for a given access point of index i is equal to:: (T$_i$−min$_{\forall\ k\ \in[0;K]}$T$_k$)/500-RSSI$_i$-N$_i$ where Ti is a date of detection of the first pairing request and min$_{\forall\ k\ \in[0;K]}$T$_k$ is the smallest value of T$_k$ over all of the access points.

13. The device as claimed in claim 11, wherein said value for a given access point of index i is equal to:

$$S_i = \alpha * \left(T_i - \min_{\forall k \in [0;K]} T_k\right) + \beta * RSSI_i + \tau_i + B_i$$

where:
   τ$_i$ is the occupancy rate of the access point of index i;
   T$_i$ is a date of detection of the first pairing request;
   min$_{\forall\ k\ \in[0;K]}$T$_k$ is the smallest value of T$_k$ over all of the access points;
   B$_i$ is a bonus value specific to the access point of index i which depends on the frequency band used by that access point; and
   α and β are constants.

14. A system for pairing a terminal with an access point in a wireless communication network, said network comprising a plurality of access points that are centrally coordinated by a manager device, said system being configured to:
- receive, by at least one access point, a first message comprising information indicating that said terminal wishes to pair with said access point;
- send, by said access point, a second message to said manager device, said second message comprising information indicating that said terminal wishes to pair with said access point;
- receive, by said manager device, said second message;
- determine, by said manager device, a value for each of said access points with which said terminal wishes to pair, said value for a given access point being representative of the capability of said access point to complete the pairing of said terminal;
- select, by said manager device, the access point having an optimal value;
- send, by said manager device, a third message to said selected access point indicating thereto to initiate a pairing session with said terminal and a stop message to unselected access points;
- add, by said selected access point, in at least one beacon frame, information indicating that a pairing session is active, said information being added only on receipt of said third message by said access point; and
- pair said access point and said terminal, wherein said value for a given access point is a function of the delay of a first pairing request detected by said access point with respect to the first pairing request detected over all of said access points.

15. The system as claimed in claim 14, wherein said value for a given access point is equal to a combination of the delay of the first pairing request detected by said access point with respect to the first pairing request detected over all of said access points and at least one of the following values:
  a) a number Ni of pairing requests detected by said access point for said terminal or an occupancy rate of said access point;
  b) an average $RSSI_1$ of the signal strength indications received from probe requests containing said detected pairing requests.

16. The system as claimed in claim 15, wherein said value for a given access point of index i is equal to:: $((T_i - \min_{\forall k \in [0;K]} T_k)/500 - RSSI_i - N_i$ where Ti is a date of detection of the first pairing request and $\min_{\forall k \in [0;K]} T_k$ is the smallest value of $T_k$ over all of the access points.

17. The system as claimed in claim 15, wherein said value for a given access point of index i is equal to:

$$S_i = \alpha * \left( T_i - \min_{\forall k \in [0;K]} T_k \right) + \beta * RSSI_i + \tau_i + B_i$$

where:
- $\tau_i$ is the occupancy rate of the access point of index i;
- $T_i$ is a date of detection of the first pairing request;
- $\min_{\forall k \in [0;K]} T_k$ is the smallest value of $T_k$ over all of the access points;
- $B_i$ is a bonus value specific to the access point of index i which depends on the frequency band used by that access point; and
- $\alpha$ and $\beta$ are constants.

* * * * *